US007176456B2

(12) United States Patent
Kawato

(10) Patent No.: US 7,176,456 B2
(45) Date of Patent: Feb. 13, 2007

(54) ION TRAP DEVICE AND ITS ADJUSTING METHOD

(75) Inventor: Eizo Kawato, Kyoto-fu (JP)

(73) Assignee: Shimadzu Corporation, Kyoto (JP)

( * ) Notice: Subject to any disclaimer, the term of this patent is extended or adjusted under 35 U.S.C. 154(b) by 70 days.

(21) Appl. No.: 11/136,589

(22) Filed: May 25, 2005

(65) Prior Publication Data

US 2005/0263698 A1 Dec. 1, 2005

(30) Foreign Application Priority Data

May 28, 2004 (JP) ............................ 2004-159678

(51) Int. Cl.
*B01D 59/44* (2006.01)
*H01J 49/00* (2006.01)

(52) U.S. Cl. ...................................... 250/292; 250/282

(58) Field of Classification Search ................ 250/292, 250/282

See application file for complete search history.

(56) References Cited

U.S. PATENT DOCUMENTS 5,354,988 A * 10/1994 Jullien ........................ 250/292
6,870,159 B2 * 3/2005 Kawato ...................... 250/292

FOREIGN PATENT DOCUMENTS

JP 2002-533881 10/2002
JP 2004-152658 5/2004
WO WO 00/38312 6/2000

OTHER PUBLICATIONS

R.E. March et al., "Quadrupole Storage Mass Spectrometry" John Wiley & Sons, Mar. 1989, pp. 31.

* cited by examiner

*Primary Examiner*—Jack Berman

*Assistant Examiner*—Jennifer Yantorno

(74) *Attorney, Agent, or Firm*—Westerman, Hattori, Daniels & Adrian, LLP.

(57) ABSTRACT

In an ion trap device including: a plurality of electrodes enclosing an ion trapping space for trapping ions; an RF driving circuit for generating an RF driving voltage; a resonant circuit for amplifying the RF driving voltage and applying an RF high voltage to at least one of the plurality of electrodes; and a tuning circuit for adjusting a resonant frequency of the resonant circuit while keeping the amplitude of the RF high voltage constant, the method of adjusting the ion trap device according to the present invention includes the steps of: adjusting a resonant frequency of the resonant circuit to a frequency of the RF driving voltage; and shifting the resonant frequency of the resonant circuit so that the RF driving voltage increases by a predetermined constant ratio. According to the ion trap device and its adjusting method of the present invention, the phase difference between the RF driving voltage of the RF driving circuit and the RF high voltage, $\theta$, is adjusted to the same value in plural devices even if the parameters of various elements constituting the resonant circuit, such as the inductance or the equivalent resistance, are slightly different from device to device. Thus the influence of the change in the resonant angular frequency $\Delta\omega$ when the amplitude of the RF high voltage is changed to the phase difference $\theta$, $\Delta\theta$, is the same among devices, and the qualities, such as the mass resolution, of all the devices are always set at their optimal, even if the same parameter values are used to determine operation timings of the device.

4 Claims, 3 Drawing Sheets

ION TRAP DEVICE AND ITS ADJUSTING METHOD

The present invention relates to an ion trap device which uses a three-dimensional quadrupole electric field to trap ions therein. Such an ion trap device can be used in an ion trap mass spectrometer, or in a time-of-flight mass spectrometer (TOFMS) using it as the ion source.

BACKGROUND OF THE INVENTION

In an ion trap device, ions are trapped in a three-dimensional quadrupole electric field generated basically by combining an RF electric field and a DC electric field. One type of ion trap device is constructed with electrodes whose inner surfaces are shaped hyperboloid-of-revolution so that a rather large ion trapping space is created in the space surrounded by the electrodes. Another type of ion trap device is constructed with cylindrical and disc electrodes (Cylindrical Ion Trap) in which an ion trapping space is created around the center of the space surrounded by the electrodes. In these constructions, the electrodes are composed of a ring electrode and two end cap electrodes placed at both ends of the ring electrodes, wherein the RF voltage for trapping ion is normally applied to the ring electrode. In either electrode construction, the mass to charge ratio (m/e) of an ion determines whether the ion is trapped in the trapping space in a stable manner, or its movement becomes unstable and it collides with the electrodes or is ejected from an opening of the electrodes. The theory of an ion trapping method is explained in, for example, R. E. March and R. J. Hughes, “Quadrupole Storage Mass Spectrometry”, John Wiley & Sons, 1989, pp. 31–110.

The RF voltage applied to the ring electrode is generated as follows. A coil is connected to the ring electrode, and an LC resonant circuit is formed by the inductance of the coil, the capacitance inherently formed between the ring electrode and the end cap electrodes, and the capacitance included in and associated with all the other circuit elements. To the LC resonant circuit, an RF driving circuit is connected directly or indirectly with a transformer coupling. Owing to the configuration, the Q value of the resonant circuit is rather high, so that an RF voltage with a large amplitude (which will be referred to as “RF high voltage”) can be applied to the ring electrode with a small RF driving voltage. Usually, the resonant frequency of the LC resonant circuit is adjusted to the frequency of the RF driving circuit with a tuning circuit using a variable capacitor.

There are some problems in the above resonant circuit. As the temperature rises, the coil expands and its inductance changes, or the capacitance of the variable capacitor changes, which leads to a deviation of the resonant frequency of the resonant circuit from the frequency of the RF driving circuit. Normally a high voltage switch is provided to the ring electrode, and the capacitance of the high voltage switch changes as the RF high voltage is changed. This also breaks the resonance condition of the resonant circuit.

Usually, a feedback control is performed to maintain the amplitude of the RF high voltage constant by adjusting the output voltage of the RF driving circuit, so that the amplitude of the RF high voltage does not change even if the resonant frequency of the resonant circuit deviates from the frequency of the RF driving circuit. But the phase of the RF high voltage deviates from that of the output of the RF driving circuit. In the ion trap device, various processes are performed relating to or using the phase of the RF high voltage applied to the ring electrode. The selection and/or dissociation of ions in the ion trap is one of such processes.

In such processes, normally, the phase information is derived from the RF driving circuit, and various timings are determined based on this phase information. When, therefore, there is a deviation between the phases of the output of the RF driving circuit and the RF high voltage, the accuracy of the process is impaired, or a proper process is impossible.

For example, when ions having various mass to charge ratios are analyzed, ions are successively ejected from the ion trap according to their mass to charge ratios while the RF high voltage applied to the ion trap is scanned. In that case, the timing when ions are ejected from an ion trap is related to the phase of the RF high voltage, and the positions of the peaks of a mass spectrum shift if there is a deviation in the phases of the RF high voltage and the RF driving circuit.

Another example is as follows. When ions are ejected from an ion trap to a TOFMS to mass analyze the ions, the kinetic energy of the ions when ejected and their ejecting direction are related to the phase of the RF high voltage when the ions are ejected. If there is a deviation in the phases, similarly, the peak positions of a mass spectrum shift.

Such a problem can be avoided, in principle, by deriving the phase signal not from the RF driving voltage, but directly from the RF high voltage which is amplified by resonance, and determine various timings based on the phase of the RF high voltage. But in practice it is very difficult to derive exact phases from the RF high voltage whose amplitude is always changing depending on respective stage of a mass analysis, and it will be very expensive and impractical to design such a monitoring circuit. Moreover it is impossible to incorporate such a function to a device already in use.

In the Japanese Unexamined Patent Publication No. 2004-152658 (which corresponds to the U.S. Pat. No. 6,870,159, and is hereinafter referred to as “Reference 1”), the following ion trap device is disclosed. A driving voltage generated by an RF driving circuit is amplified by a resonant circuit, and the amplified RF voltage is applied to at least one of electrodes constituting an ion trap. The resonant circuit includes a tuning circuit to change the resonant frequency of the resonant circuit, and the resonant frequency of the resonant circuit is controlled to deviate from the frequency of the RF driving voltage. Owing to the control, the resonant frequency of the resonant circuit is intentionally shifted from the frequency of the RF driving voltage. This decreases the influence of the change in the resonant frequency when the RF high voltage is changed to the difference in the phases of the RF driving voltage and the RF high voltage. Thus the shift of the peak positions in a mass spectrum is prevented, and the accuracy and sensitivity of mass analyses are enhanced because various qualities of the mass spectrometer having their base to the phases of the RF high voltage are prevented from deteriorating.

If the cause of the difference in the phases of the RF driving voltage of the RF driving circuit and the RF high voltage depends on the amplitude of the RF high voltage, the shifting direction should be properly controlled, otherwise the oscillation of the resonant circuit cannot be stable. For example, when a semiconductor element is connected to the electrode of the ion trap to which the RF high voltage is applied, the effective capacitance of the semiconductor element increases as the amplitude of the RF high voltage increases, and the resonant frequency of the resonant circuit decreases. Here it is supposed that the resonant frequency is increased from the frequency of the RF driving voltage by decreasing the capacitance of the tuning circuit. If the amplitude of the RF high voltage is increased, the capacitance of the semiconductor element increases, and the resonant frequency comes closer to the frequency of the RF driving voltage. This increases the gain of the resonant circuit, and constitutes a positive feedback that deteriorates the stability of the resonant circuit. Thus, when a semiconductor element is connected to such an electrode, it is necessary to adequately control the shifting direction of the resonant frequency so that the resonant frequency decreases. This can be done by increasing the capacitance using a tuning circuit, for example increasing the value of a variable capacitor. Generally speaking, if the resonant frequency changes to a certain direction when the amplitude of the RF high voltage increases, it is preferable to adjust the tuning circuit so that the resonant frequency is shifted to the same direction. This stabilizes the oscillation, and assures the above effects of enhancing the accuracy and sensitivity of mass analyses.

SUMMARY OF THE INVENTION

In the ion trap device disclosed in Reference 1, deviation of the phase difference between the RF driving voltage of the RF driving circuit and the RF high voltage is decreased, and the qualities of the mass analyses relating the phase, such as shift of the mass peaks, is prevented from deteriorating. But the amount of the shift of the resonant frequency may differ from device to device, and Reference 1 does not clearly describe a concrete method of determining the amount of the shift. As indicated in Reference 1, deviation of the phase difference becomes less as the amount of the shift of the resonant frequency is larger, and the qualities of the mass analyses are improved more. As described at paragraph 0024 of Reference 1, specifically, the resonant frequency of the resonant circuit is shifted so that, when the target amplitude of the RF high voltage is set at its highest value, the RF driving voltage of the RF driving circuit reaches its highest possible value. This maximizes the shift of the resonant frequency of the resonant circuit from the frequency of the RF driving voltage, and also maximizes the phase difference between the RF driving voltage and the RF high voltage, which minimizes the influence of the change of the resonant frequency when the RF high voltage is changed to the phase difference.

However, when such an operation is made on several ion trap devices, the amount of phase difference is slightly different from device to device because various parameters, such as the inductance or effective resistance, of the elements used in the resonant circuit differ slightly among them. When the same values of the timing of the operation are used for the devices, their influence on the phase difference between the RF driving voltage and the RF high voltage differs among devices, and the qualities, such as the mass resolution, of all the devices are not always optimal.

Thus an object of the present invention is to provide an ion trap device in which the phase difference between the RF driving voltage and the RF high voltage is always adjusted at a constant value, and many devices can be set at the optimal condition.

According to the present invention, an ion trap device for trapping ions in an ion trapping space includes:

a plurality of electrodes enclosing the ion trapping space;

an RF driving circuit for generating an RF driving voltage;

a resonant circuit for amplifying the RF driving voltage and applying an RF high voltage to at least one of the plurality of electrodes; and a tuning circuit for adjusting a resonant frequency of the resonant circuit while keeping the amplitude of the RF high voltage constant; where in the resonant frequency of the resonant circuit is adjusted to the frequency of the RF driving voltage and, then, shifted so that the RF driving voltage increases by a predetermined constant ratio.

Also, in an ion trap device including:

- a plurality of electrodes enclosing an ion trapping space for trapping ions;
- an RF driving circuit for generating an RF driving voltage;
- a resonant circuit for amplifying the RF driving voltage and applying an RF high voltage to at least one of the plurality of electrodes; and
- a tuning circuit for adjusting a resonant frequency of the resonant circuit while keeping the amplitude of the RF high voltage constant j:

a method of adjusting the ion trap device according to the present invention includes the steps of:

- adjusting a resonant frequency of the resonant circuit to a frequency of the RF driving voltage; and, then,
- shifting the resonant frequency of the resonant circuit from the frequency of the RF driving voltage so that the RF driving voltage increases by a predetermined constant ratio.

According to the ion trap device and its adjusting method of the present invention, the phase difference θ between the RF driving voltage of the RF driving circuit and the RF high voltage is adjusted to the same value in plural devices even if the parameters of various elements constituting the resonant circuit, such as the inductance or the equivalent resistance, are slightly different from device to device. Thus the influence of the change in the resonant angular frequency Δω when the amplitude of the RF high voltage is changed to the phase difference θ, Δθ, is the same among devices, and the qualities, such as the mass resolution, of all the devices are always set at their optimal, even if the same parameter values are used to determine operation timings of the device.

DETAILED DESCRIPTION OF A PREFERRED EMBODIMENT

Figure 2:
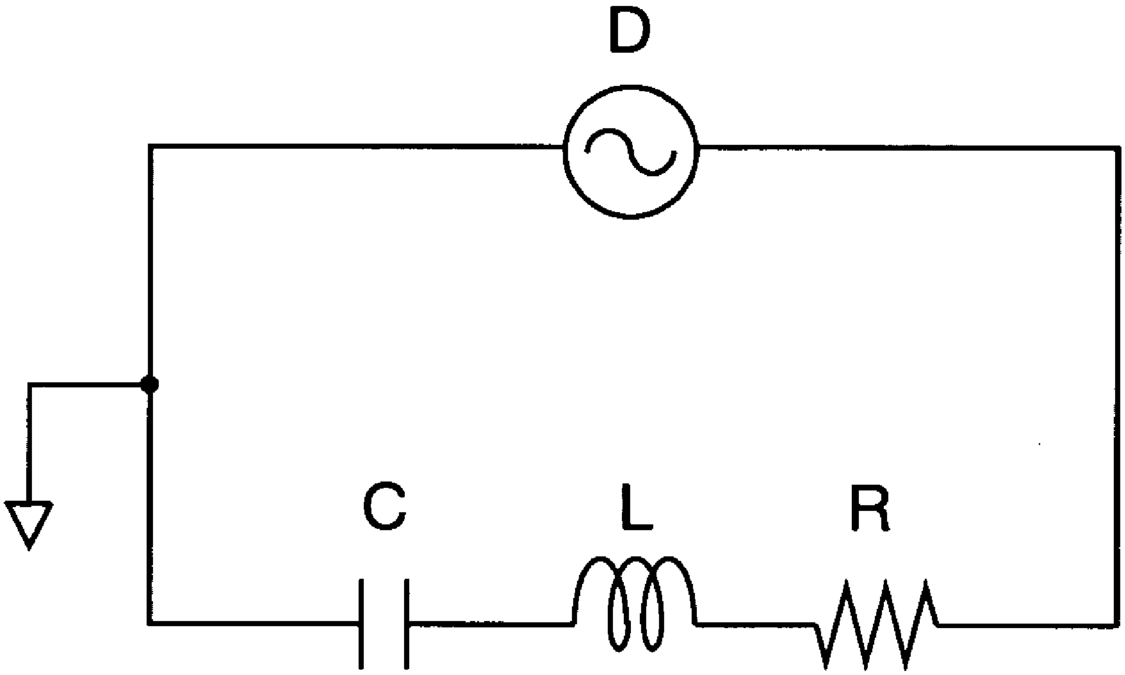
FIG. 2 is a simplified circuit diagram of an LCR resonant circuit for explaining the working principle of the present invention.

The principle of operation of the present invention is described referring to the simplified LCR series resonant circuit diagram shown in FIG. 2. The total capacitance is represented by C, the inductance of the coil is represented by L, and the equivalent resistance of the resonant circuit is represented by R. The angular frequency of the RF driving voltage generated by the RF driving circuit D is represented by $\omega_0$, and the resonant angular frequency of the resonant circuit is represented by $\omega$, where an angular frequency $\omega$ is a frequency multiplied by $2\pi$. The impedance Z of the resonant circuit is given by $$Z=R+jX,$$

where $$X=\omega L-1/(\omega C).$$

In the first step (step 1), the resonant angular frequency $\omega$ of the resonant circuit is made equal to the angular frequency $\omega_0$ of the RF driving voltage by adjusting the inductance L or the capacitance C. Then the resonance condition is satisfied, and X becomes zero (X=0). In this case, as derived from the above equation, the impedance Z of the resonant circuit becomes the minimum value R, which means that the RF high voltage can be obtained from a minimum RF driving voltage. Representing the RF driving voltage at this resonance condition with $V_1$, the current I flowing through the resonant circuit is given by $$I=V_1/R.$$

The RF high voltage $V_{RF}$ generated between electrodes of an ion trap corresponds to the voltage across the capacitance C. Since the impedance of the capacitance C is $$-j/(\omega_0 C)\approx -j\omega_0 L,$$

the RF high voltage is give by $$V_{RF}=(-j\omega_0 L/R)\cdot V_1.$$

The gain $Q=\omega_0 L/R$ of the resonant circuit is called Q-value. In a general ion trap device, the Q-value of the resonant circuit is set at about 100–300.

In the second step (step 2), the resonant angular frequency $\omega$ of the resonant circuit is adjusted by changing, for example, the capacitance C, while the RF high voltage $V_{RF}$ is kept constant so that the amplitude of the RF driving voltage is increased until its value reaches the constant value, k (=1+j$\kappa$), times the value $V_1$ of the RF driving voltage at step 1. Representing the driving voltage with $V_2=kV_1$, the current I flowing through the resonant circuit is given by $$I=V_2/Z,$$

and the RF high voltage is given by $$V_{RF}=(-j\omega_0 L/Z)\cdot V_2.$$

Since the RF high voltage $V_{RF}$ is kept constant, $$k=V_2/V_1=Z/R=1+j(X/R),$$

or $$\kappa=X/R.$$

Regarding the relationship between the RF high voltage $V_{RF}$ and the RF driving voltage $V_2$ at step 2, the phase difference $\theta$ between the RF driving voltage of the RF driving circuit and the RF high voltage is calculated as $$\theta=-\pi/2-\angle Z=-\pi/2-arc\ \tan(X/R)=-\pi/2-arc\ \tan\ \kappa.$$

This equation shows that, because the value k is maintained constant, $\kappa$ is also constant and so the phase difference $\theta$, even though the equivalent resistance R or inductance L changes.

This means that the influence of the change in the resonant frequency when the RF high voltage is changed to the phase difference $\theta$ between the RF driving voltage of the RF driving circuit and the RF high voltage is equal among devices, even though the parameters of the elements, for example, the resistance R, constituting the resonant circuit of the devices vary slightly. This allows the use of the same parameters to determine the timings of the operation of the devices, and the timings are optimal throughout all devices.

For example, when the capacitance C is changed, the reactance X is given by $$X=\omega_0 L-1/(\omega_0 C)=QR(1-\omega^2/\omega_0^2)\approx 2QR\cdot(\omega_0-\omega)/\omega_0.$$

The relationship between the change in the resonant angular frequency, $\Delta\omega$, and the change in the phase difference, $\Delta\theta$, is calculated by differentiating the phase difference $\theta$ with respect to angular resonant frequency $\omega$ as $$\Delta\theta\approx 2Q\ \cos^2(\angle Z)\cdot(\Delta\omega/\omega_0).$$

When the angular resonant frequency $\omega$ of the resonant circuit is shifted from the angular frequency $\omega_0$ of the RF driving circuit, the ratio of change in the phase difference, $\Delta\theta$, to the change in the resonant angular frequency, $\Delta\omega$, decreases from that in the resonant condition, $\angle Z=0$, according to $\cos^2(\angle Z)$. Using the relationship $\Delta\omega/\omega=-(1/2)\Delta C/C$, the above equation can be rewritten by using the change in the capacitance, $\Delta C$, as $$\Delta\theta\approx -Q\ \cos^2(\angle Z)\cdot(\Delta C/C),$$

which also shows that $\Delta\theta$ decreases according to $\cos^2(\angle Z)$.

Thus it is preferable to set the value of k (or $\kappa$) as large as possible. That is, the value of $k=V_2/V_1$ should be set at the largest within the range that the RF driving circuit can output in all ion trap devices that have various values of parameters.

Figure 1:
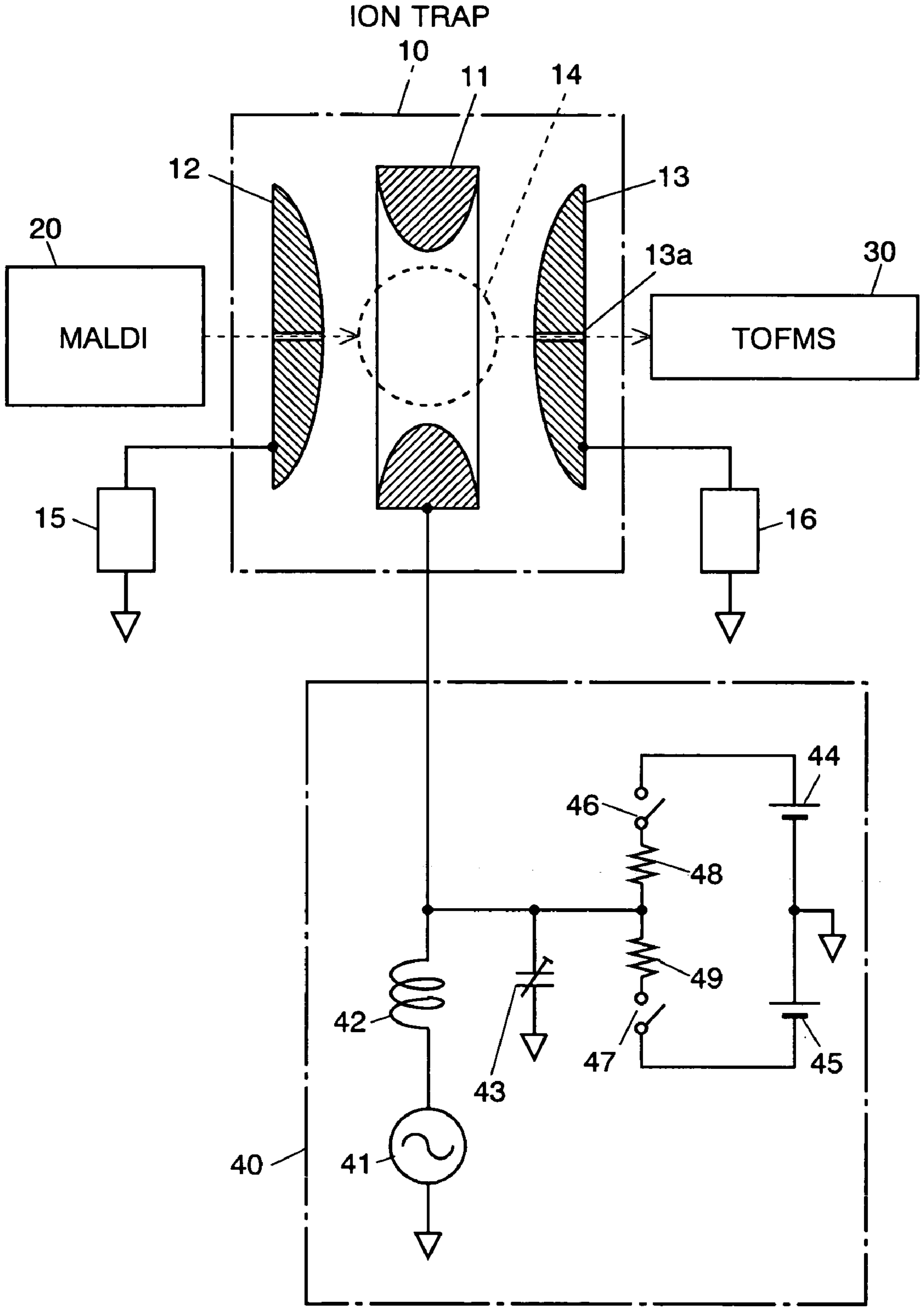
FIG. 1 is a schematic diagram of the main part of a mass spectrometer using an ion trap device of the present invention.

A mass spectrometer using an ion trap device embodying the present invention is described. FIG. 1 is a schematic diagram of the main part of the mass spectrometer, where the ion trap 10 is composed of a ring electrode 11 and a pair of end cap electrodes 12, 13 opposing each other with the ring electrode 11 therebetween. To the ring electrode 11, a ring voltage generator 40 is connected. When an RF high voltage is applied to the ring electrode 11 from the ring voltage generator 40, a quadrupole electric field is generated within the ion trapping space 14 surrounded by the electrodes 11, 12 and 13, and ions are trapped there. End cap voltage generators 15 and 16 are respectively connected to the end cap electrodes 12 and 13, and appropriate voltages are applied to the end cap electrodes 12 and 13 at respective stages of a mass analysis.

For example, when ions generated by the MALDI (Matrix-Assisted Laser Desorption/Ionization) ion source 20 are introduced into the ion trap 10, the voltages applied to the end cap electrodes 12 and 13 are set so that the ions are decelerated and their kinetic energy is reduced. When the ions are mass-analyzed with the TOFMS 30, the voltages applied to the end cap electrodes 12 and 13 are set so that ions in the ion trapping space 14 are accelerated and ejected toward the TOFMS 30. Further, when ions in the ion trapping space 14 are selected or dissociated, the voltages applied to the end cap electrodes 12 and 13 are set so that an appropriate selection or excitation electric field is superposed over the ion trapping quadrupole electric field.

In the ring voltage generator 40, a coil 42 is provided, which is connected to the ring electrode 11. Basically, the inductance of the coil 42 and the capacitance inherently associated with the gaps between the ring electrode 11 and the end cap electrodes 12, 13 constitute a resonant circuit.

Precisely, besides those between the electrodes 11, 12 and 13, the capacitance of the resonant circuit further includes those of the RF high voltage monitoring circuit (not shown in the drawing), the tuning circuit 43, the high voltage switches 46, 47 and capacitance associated with wiring in the whole circuits.

There are various methods of driving the LC resonant circuit, including one using a transformer. In the present embodiment, an end of the coil 42 is directly driven by the RF driving circuit 41. Since the frequency of the RF driving circuit 41 is fixed at 500 kHz, the tuning circuit 43 is tuned to adjust the resonant frequency of the LC resonant circuit to about 500 kHz, so that a resonated and amplified voltage is obtained. In the present embodiment, a vacuum variable capacitor is used for the tuning circuit 43, and its capacitance is adjusted to obtain resonance. Alternatively, the inductance of the coil 42 can be adjusted, moving a ferrite core, for example, to obtain resonance.

To the ring electrode 11 are further connected high voltage DC sources 44, 45 via high voltage switches 46, 47. These are used to quickly start the RF high voltage when ions are injected into the ion trap 10, and to quickly damp it when ions are ejected from the ion trap 10.

An example of quickly starting the RF high voltage from a negative voltage is described. First, the high voltage switch 47 which is connected to the negative high voltage DC source 45 is closed, so that the voltage of the ring electrode 11 becomes equal to that of the negative high voltage DC source 45. Then, within a short time, the high voltage switch 47 is opened, whereby the resonant circuit starts oscillation at the resonant frequency.

When the oscillation of the resonant circuit is to be quickly damped, the high voltage switches 46 and 47 are simultaneously closed, and the output of the RF driving circuit 41 is turned to zero. Since the magnitudes of the positive and negative DC voltage sources 44 and 45 are the same, and the internal resistances of the switches 46 and 47 are the same, the RF high voltage becomes zero. After all the ions in the ion trap 10 are ejected, the two switches 46 and 47 are opened. Detail of the process is described, for example, on page 5 of W000/38312.

Since the high voltage switches 46 and 47 need to be high-speed, semiconductor switches using power MOSFET or similar devices are used for the high voltage switches 46 and 47. The semiconductor elements used in the semiconductor switches have the characteristics that their capacitance increases as the voltage across them decreases. Thus, when the amplitude of the RF high voltage applied to the ring electrode 11 changes and accordingly the voltage across the high voltage switches 46, 47 changes, the capacitance of the switches 46, 47 changes slightly. Normally, the amount of increase in the capacitance of the voltage switches 46, 47 when the voltage across them decreases is larger than the amount of decrease in the capacitance when the voltage increases. Thus, though the amplitude of the RF high voltage applied to the ring electrode 11 changes sinusoidally and symmetrically in the positive and negative directions, the capacitance of the high voltage switches 46, 47 increases in average. And, as the amplitude of the RF high voltage applied to the ring electrode 11 increases, the increase in the capacitance of the high voltage switches 46, 47 becomes larger. These decrease the resonant frequency of the resonant circuit, and the condition of the resonant circuit deviates from the initial condition.

In the mass spectrometer of the present embodiment, the operator adjusts the tuning circuit 43 of the resonant circuit as follows.

(1) Set the target amplitude of the RF high voltage at a low value.

Figure 3A:
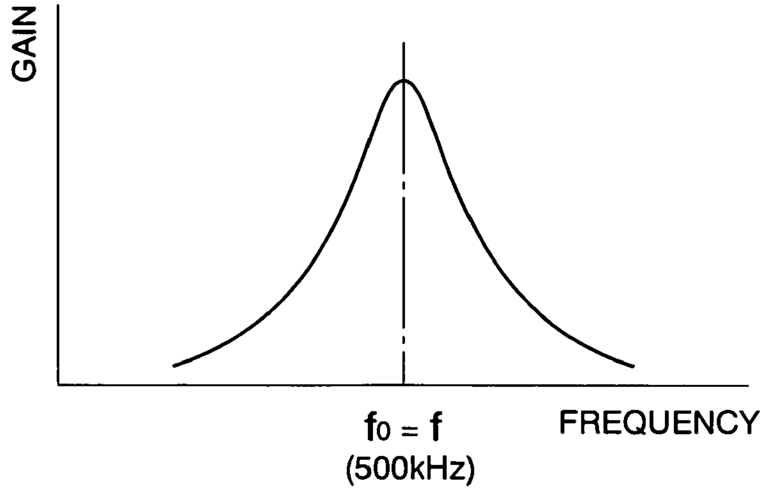
FIGS. 3A–3C are simplified graphs for explaining the relationship between the gain and the frequency of the resonant circuit.

(2) Adjust the capacitance of the tuning circuit 43 so that the RF driving voltage of the RF driving circuit 41 is the smallest while the above target amplitude is maintained. Then, the resonance condition is met, and the resonant frequency of the resonant circuit is equal to the frequency of the RF driving voltage of the RF driving circuit 41. FIG. 3A schematically shows the relationship between the frequency and the gain of the resonant circuit. In this resonance condition, the frequency $f_0$ of the RF driving voltage of the RF driving circuit 41 is equal to the resonant frequency f of the resonant circuit, and the gain of the resonant circuit is the maximum.

(3) Then the target amplitude of the RF high voltage is set at the largest value possible. The RF driving voltage at this time is $V_1$ (step 1).

Figure 3B:
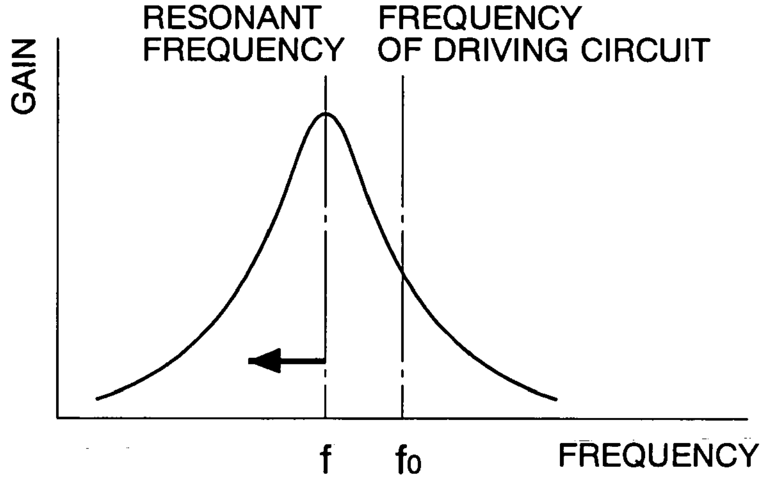

(4) The capacitance of the tuning circuit 43 is gradually increased. As the capacitance increases, the resonant frequency f of the resonant circuit decreases as shown in FIG. 3B, and the gain at the frequency $f_0$ of the RF driving voltage of the RF driving circuit 41 decreases. Since the amplitude of the RF high voltage is controlled by a feedback control to be kept at the target amplitude, the RF driving voltage increases to compensate for the decrease in the gain. Then the RF driving voltage of the RF driving circuit 41 is adjusted to become $V_2=kV_1$, or the constant value, k, times the driving voltage $V_1$ at the resonance condition (step 2). The constant value of k is predetermined so that the RF driving voltage does not exceed the possible maximum irrespective of the variation in the value of various parameters of all the devices.

Thus, in the present invention, by increasing the RF driving voltage of the RF driving circuit 41 by a predetermined constant ratio from that of the resonance condition, the phase difference between the RF driving voltage of the RF driving circuit 41 and the RF high voltage when the amplitude of the RF high voltage is changed is the same among individual devices with irrespective of varied values of parameters of individual devices, and stabilizes the performances of the devices.

In the above procedure, the resonant frequency of the resonant circuit is already changed when the target amplitude of the RF high voltage is increased at stage (3) above. It is thus possible to find the condition again where the RF driving voltage of the RF driving circuit 41 becomes minimum after the target amplitude of the RF high voltage is set at the maximum available value, and read the value of the RF driving voltage as $V_1$. In this case, the constant value, k, to be used at stage (4) above may be different from the one described above.

It is not necessary to do the above-described adjustment at every measurement, because, once the adjustment is done, the tuning condition of the resonant circuit is thought to be hardly changed unless changes of some kinds should occur, such as a disassembling the device for maintenance or repair, or changes due to long time use. Of course, there is no problem for the operator to do the above adjustment when he/she thinks it necessary.

Figure 3C:
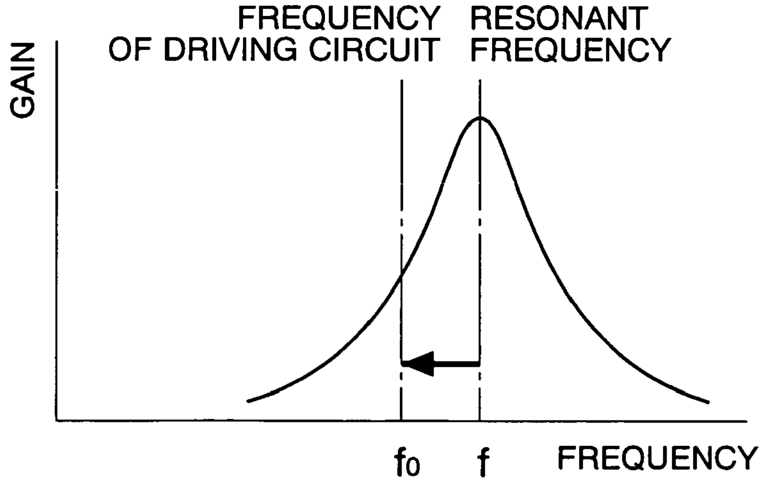

When the tuning condition is shifted by increasing the capacitance of the tuning circuit 43 as described above, the gain of the resonant circuit decreases as the RF high voltage increases while the capacitance of the high voltage switches 46, 47 increases, and the oscillation is stable. On the other hand, when the capacitance of the tuning circuit 43 is decreased, the tuning condition is shifted as shown in FIG. 3C. When the RF high voltage is increased and the capacitance of the high voltage switches 46, 47 increases, the resonant frequency of the resonant circuit, f, decreases as shown by the arrow in FIG. 3C toward the frequency of the RF driving voltage, $f_0$, and the gain of the resonant circuit increases. In this case, the RF high voltage further increases even if the RF driving voltage is unchanged, which constitutes a positive feedback and the oscillation becomes unstable. This impedes the proper operation of the device. Thus it is important to shift the tuning condition by not decreasing but by increasing the capacitance of the tuning circuit 43.

As described above, the RF driving voltage of the RF driving circuit 41 increases when the tuning condition is shifted. This is due to the change in the reactance of the resonant circuit, and the power consumed by the RF driving circuit 41 is not changed, because the RF current is constant as long as the amplitude of the RF high voltage is kept constant irrespective of the tuning condition, and, as long as the equivalent resistance is not changed, the power consumption is not changed.

In the above-described embodiment, the resonant circuit is constructed so that the resonant frequency decreases when the RF high voltage is increased. If the resonant circuit is constructed inversely, i.e., the resonant frequency increases as the RF high voltage increases, the capacitance of the tuning circuit 43 should be decreased to adjust the resonant circuit so that the RF driving voltage of the RF driving circuit 41 becomes the RF driving voltage at the resonance condition multiplied by a predetermined constant value.

Although only some exemplary embodiments of the present invention have been described in detail above, those skilled in the art will readily appreciate that many modifications are possible without materially departing from the present invention. Accordingly, all such modifications are intended to be included within the scope of the present invention.

What is claimed is:

1. An ion trap device for trapping ions in an ion trapping space comprising:

a plurality of electrodes enclosing the ion trapping space;

an RF driving circuit for generating an RF driving voltage;

a resonant circuit for amplifying the RF driving voltage and applying an RF high voltage to at least one of the plurality of electrodes; and a tuning circuit for adjusting a resonant frequency of the resonant circuit while keeping the amplitude of the RF high voltage constant; wherein the resonant frequency of the resonant circuit is adjusted to the frequency of the RF driving voltage and, then, shifted so that the RF driving voltage increases by a predetermined constant ratio.

2. The ion trap device according to claim 1, wherein the resonant frequency of the resonant circuit is shifted in the same direction as the direction of the change in the resonant frequency when the RF high voltage is increased.

3. A method of adjusting an ion trap device comprising:

a plurality of electrodes enclosing an ion trapping space for trapping ions;

an RF driving circuit for generating an RF driving voltage;

a resonant circuit for amplifying the RF driving voltage and applying an RF high voltage to at least one of the plurality of electrodes; and a tuning circuit for adjusting a resonant frequency of the resonant circuit while keeping the amplitude of the RF high voltage constant;

wherein the method comprises steps of:

adjusting a resonant frequency of the resonant circuit to a frequency of the RF driving voltage; and, then, shifting the resonant frequency of the resonant circuit from the frequency of the RF driving voltage so that the RF driving voltage increases by a predetermined constant ratio.

4. The ion trap adjusting method according to claim 3, wherein the resonant frequency of the resonant circuit is shifted in the same direction as the direction of the change in the resonant frequency when the RF high voltage is increased.

* * * * *